June 3, 1958  A. J. ZUPANCIC  2,837,072
FUEL METERING SYSTEM
Filed Jan. 9, 1957  3 Sheets-Sheet 3
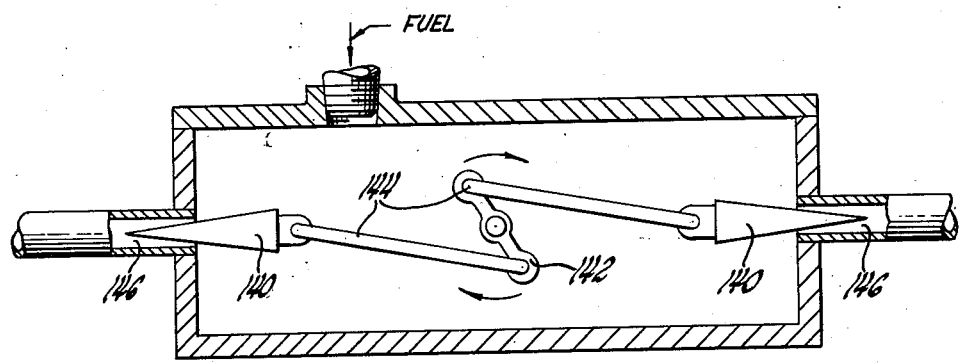
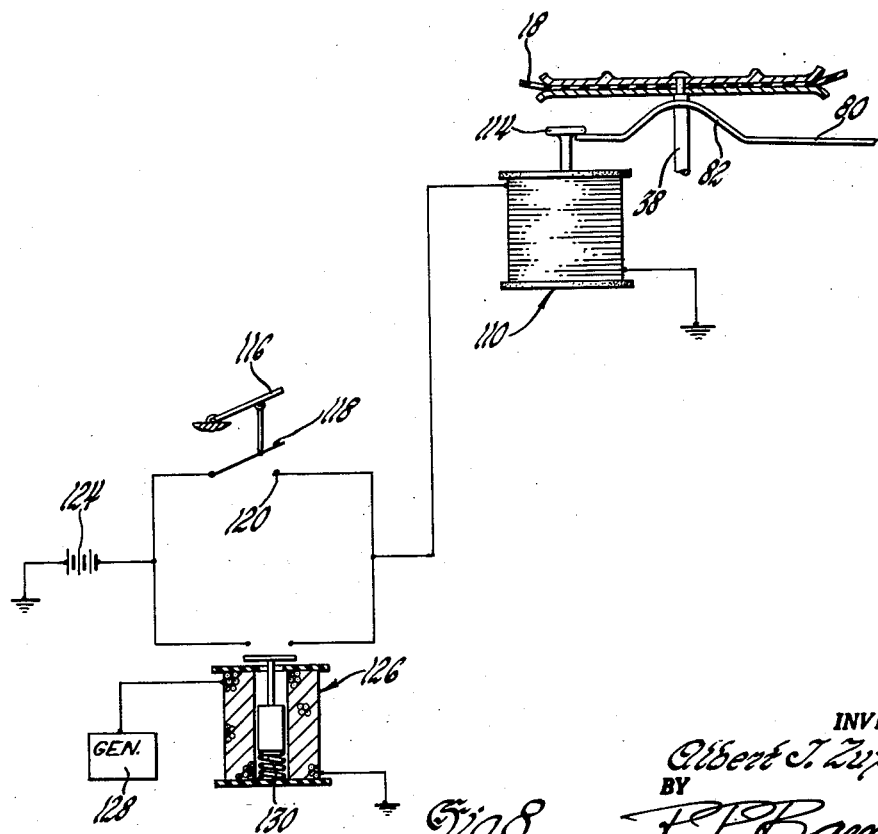
INVENTOR.
Albert J. Zupancic
BY
R. F. Barnard
ATTORNEY

United States Patent Office 2,837,072
Patented June 3, 1958

2,837,072
FUEL METERING SYSTEM

Albert J. Zupancic, Royal Oak, Mich., assignor to General Motors Corporation, Detroit, Mich., a corporation of Delaware Application January 9, 1957, Serial No. 633,349

18 Claims. (Cl. 123—119)

The present invention relates to an improved continuous flow type fuel metering system which is particularly adapted for use with a fuel induction system for an internal combustion engine.

The present system provides for the synchronized flow of fuel flow to all cylinders of the engine in such a way as to insure an equalization of the power produced by each cylinder. Heretofore it has been the practice in most continuous flow fuel systems of the type to which the present invention relates to provide a single fuel metering valve for controlling the total quantity of fuel to be distributed to the individual cylinders. To thus meter fuel with a single valve requires relatively large ports or passages which inherently are less accurately controlled than small ports or passages. The present invention is directed to providing a unique metering system in which individual metering valves or their equivalents are utilized in supplying fuel to the individual cylinders. In this way more accurate control of fuel flow is realized with a resultant economy in fuel consumption as well as better engine response to operator demand.

The present fuel metering system also includes a unique device whereby the flow of fuel through the system is cut off under decelerating conditions resulting in the reduction of the amount of unburned hydrocarbons which are ungainfully exhausted from the engine. The present invention also includes a device adapted to operate in conjunction with the deceleration fuel cut-off device for at least periodically reestablishing the flow of fuel during conditions of incipient stalling while the engine is being decelerated.

It is also an object of the present invention to provide a mechanism which adjusts the operation of the fuel metering system to directly reflect the load on the engine such that more fuel will be available to the engine under high than under low load conditions. This feature results in better fuel economy under normal operating conditions at the same time providing additional fuel when required.

Other improvements and advantages have resulted from the present invention as will be seen from a perusal of the detailed description which follows.

In the drawings:

Figure 7 is a third species of the metering valve; and

Figure 8 is a diagrammatic representation of the deceleration control system.

Figure 1:
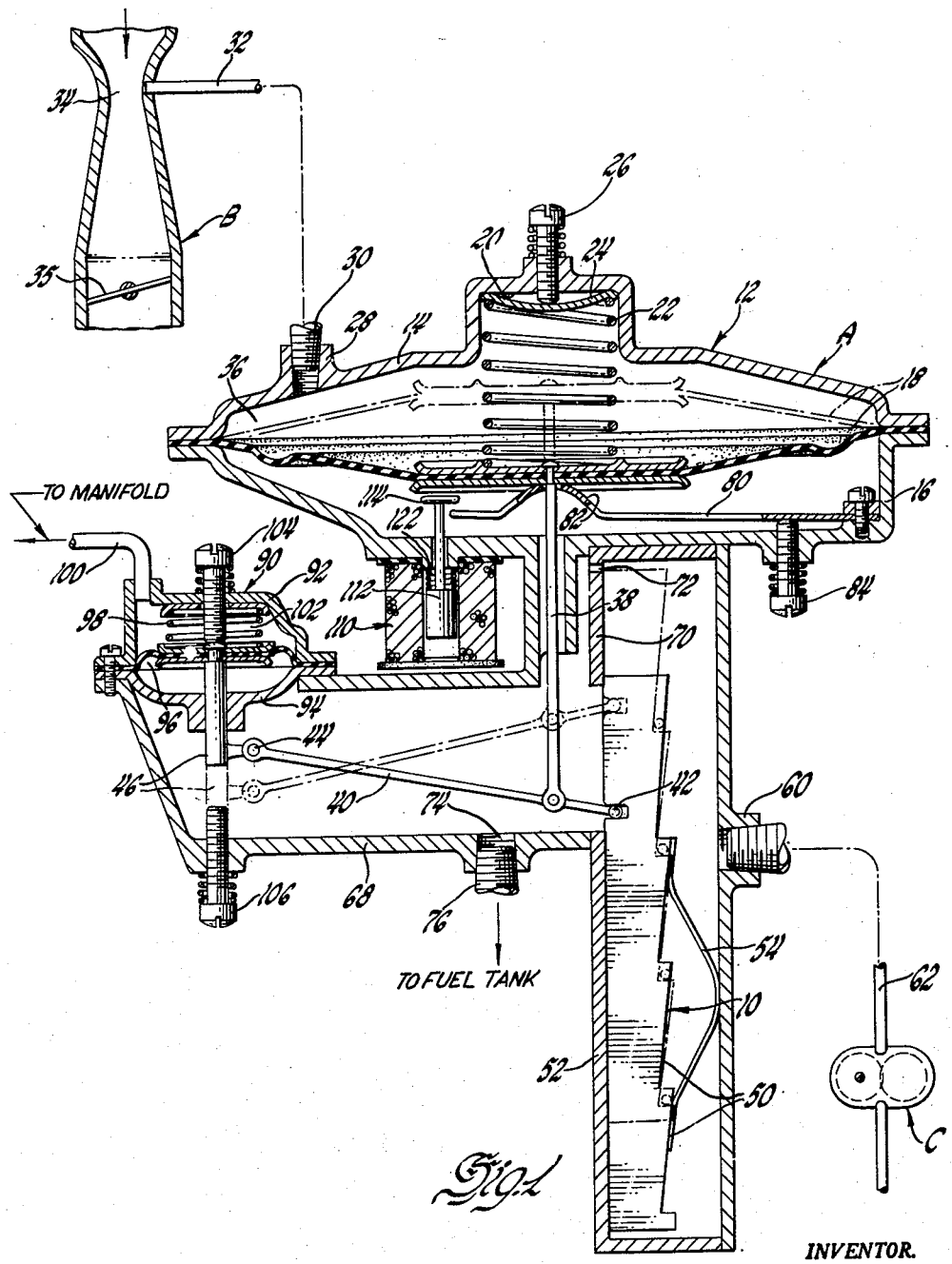
Figure 1 is a diagrammatic representation of the fuel system embodying the subject invention.
Figure 2:
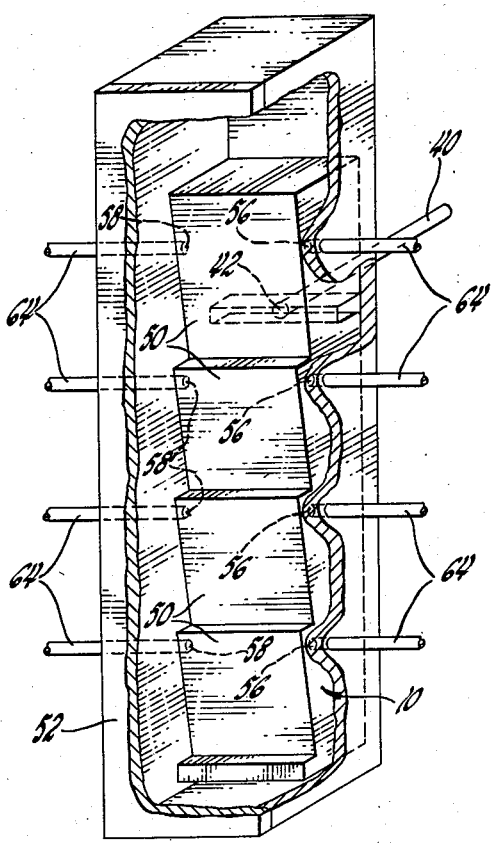
Figure 2 is an isometric view of one species of the fuel control valve.

While the present fuel metering system has considerable general applicability it is particularly adapted for use with a fuel induction system of the type which has been shown diagrammatically in Figure 1. In Figure 1 the fuel metering device is shown generally at A, an air induction passage at B and a fuel supply pump at C.

The metering device A includes a metering valve indicated generally at 10 and a servo device 12 adapted to actuate the valve in response to certain engine operating conditions as will now be more particularly described. The servo device 12 includes a pair of casing members 14 and 16 having a diaphragm member 18 peripherally clamped therebetween. The upper casing member 14 has a spring supporting cavity 20 which houses one end of spring 22 the other end of which coacts with the diaphragm 18 and urges the latter in a downwardly direction. A disc or washer-like member 24 is slidably disposed in casing portion 20 to provide an adjustable seat for spring 22. Disc 24 may be axially adjusted by a screw 26 to vary the rate of the spring 22 and thus vary the operation of the diaphragm 18.

A boss 28 is also formed in the upper casing member 14 and within which boss a fitting 30 is threadably mounted. Fitting 30 is adapted to connect with a passage 32 the other end of which communicates with a venturi portion 34 of the induction passage B anteriorly of throttle 35. A vacuum signal or force is created in passage 32 which is directly proportional to the mass of air flowing through the induction passage. This variable vacuum force is communicated to the chamber 36 defined by the diaphragm 18 and the upper casing member 14 and works in opposition to the spring 22 in controlling the movement of the diaphragm. As the mass of air flowing through induction passage B increases the vacuum transmitted to chamber 36 will similarly increase moving the diaphragm upwardly against the force of spring 22.

The diaphragm 18 has a rod 38 centrally fixed thereto which is adapted to move up and down with the movement of the diaphragm. A lever 40 is articulated intermediate its ends to the rod 38 and has one end 42 which is pivotally connected to the fuel metering valve 10. The other end 44 of lever 40 is appropriately articulated to a rod 46 to provide an adjustable fulcrum for the lever system 38—40.

The metering valve 10 shown in Figures 1–5, includes a plurality of stepped or tapered portions 50. Valve 10 is slidably mounted within a casing 52. A flat spring element 54 is disposed between the casing 52 and the sliding bar valve member 10 to retain the latter in position within the casing. As better shown in Figure 2, casing 52 has a plurality of longitudinally spaced ports 56 formed therein. An equal number of axially aligned ports 58 are disposed on opposite sides of the casing. The sliding valve member 10 is adapted to slidably move between the oppositely disposed sets of ports 56 and 58 such that each tapered valve portion 50 controls the flow of fuel to an oppositely disposed pair of ports 56 and 58. Casing 52 has a boss 60 formed therein which is adapted to have one end of a passage 62 connected thereto, the other end of the passage connecting with the fuel pump C which continuously supplies fuel under pressure to the casing 52. Each of the ports 56 and 58 has a fuel line 64 connected thereto and each of which lines 64 is adapted to supply fuel for one cylinder of the engine.

An additional casing 68 is provided as a part of the fuel metering device A and is contiguously disposed with respect to casing 52 having a wall 70 in common therewith. Casings 52 and 68 are in communication through an opening 72 in wall 70. An outlet 74 is formed in the bottom of casing 68 and communicates with any suitable passage means 76 leading back to a fuel supply tank. The opening 72 is positioned that regardless of the position of the sliding bar valve 10 communication will at all times be established between the casings 52 and 68 providing a continuous flow of fuel through the fuel casing 52 to insure the fuel lines are at all times filled with fuel. Without providing for the continuous flow of fuel through the fuel metering system there would be a problem of air or vapor getting into the fuel lines resulting in an uneven flow of fuel in a line so affected.

In the species of fuel control valve shown in Figures 1–5 each tapered or wedged shaped surface 50 of the valve 10 is adapted to coact with a pair of axially aligned ports to control the fuel flow thereto as determined by the valve's position within the casing 52. The position of valve 10 is determined by the diaphragm member 18 which, as already noted, is positioned in accordance with the mass of air flowing through induction passage B.

To assure a suitable quantity of fuel will flow from the fuel casing 52 into the respective fuel lines 64 during idling conditions, a spring member 80 is mounted as a cantilever in the lower casing member 16 of the metering device A. The free end of spring member 80 has an upstruck portion 82 which is adapted to engage the diaphragm 18 to prevent the latter from moving downwardly under the influence of spring 22 an amount sufficient to cause the sliding valve 10 to completely close off the fuel to fuel lines 64.

Figure 4:
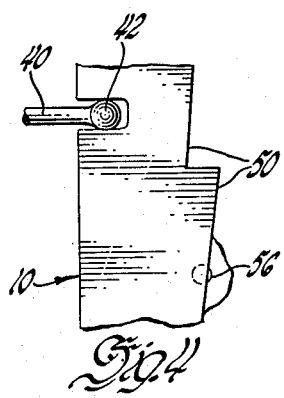

Servo casing 16 has an adjustable screw 84 mounted therein which is adapted to engage with the spring member 80 and provide an adjustment of the rate of the spring in order to vary the amount of idling fuel supplied. As the adjusting screw 84 is threaded upwardly, the spring 80 would intercept the downward movement of the diaphragm 18 sooner and thus provide for a greater quantity of idling fuel. Accordingly, when the engine is idling and very little air is flowing through the venturi 34 there will be insufficient vacuum provided in chamber 36 to overcome the force of spring 22 which will, therefore, move the diaphragm downwardly until it engages the idling fuel spring 80 which will counterbalance the force of spring 22 to insure a given amount of idling fuel being provided to the fuel lines 64. As shown in Figure 4, with the sliding valve 10 in its idling position, each wedge portion 50 will uncover a small portion of the associated ports 56 and 58 permitting the idling fuel to flow to the fuel lines 64 as already described.

Figure 5:
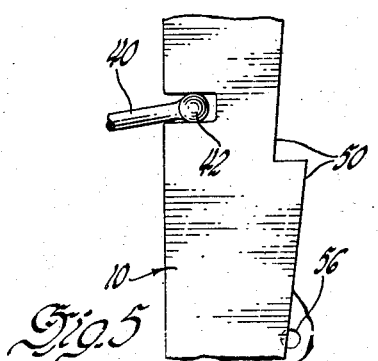

As the speed of the engine increases the vacuum force in chamber 36 will increase raising the diaphragm against the force of spring 22 and similarly raising the sliding valve 10 to further uncover the fuel ports 56 and 58, as shown in Figure 5, and permitting a quantity of fuel to flow to the respective cylinders which is proportional to the mass of air flowing through the induction passage B.

While the system as thus far described is sufficient to provide adequate fuel to the engine during idling and normal road load conditions, it is necessary to provide a full load enrichment device, indicated generally at 90, which will provide for additional fuel under high load or power conditions. Device 90 includes a servo mechanism comprising upper and lower casing members 92 and 94 having a diaphragm 96 peripherally clamped therebetween and which diaphragm is urged downwardly by a spring member 98 disposed between the diaphragm 96 and the upper casing member 92. The lower casing is suitably apertured to slidably mount the rod 46 therein which is centrally fixed to the diaphragm 96. As already noted rod 46 has one end of lever 40 articulated thereto. The upper casing 92 through a suitable connection 100 connects with any suitable passage communicating with the engine intake manifold whereby the chamber 102 defined by the upper casing 92 and the diaphragm 96 has manifold vacuum communicated thereto. Manifold vacuum acts on the diaphragm 96 in opposition to the force of spring 98 to determine the position of rod 46. Under normal operating conditions the manifold vacuum in chamber 102 will be of a sufficiently high value to move the diaphragm to its upper position, shown in Figure 1, to provide a road load position for the fulcrum end 44 of lever 40.

When the operator depresses the accelerator pedal, effecting an increased power demand, manifold vacuum will decrease permitting the spring 98 to shift the rod 46 downwardly to its full load enrichment position and in so doing shift the sliding valve 10 upwardly to completely uncover the fuel ports 56 and 58 to provide the maximum amount of fuel to the cylinders. As soon as the maximum power situation has been satisfied manifold vacuum will again increase shifting the rod 46 once again to its upper or road load position for more economical operation. The upper casing member 92 has an adjustment screw 104 mounted therein for adjustably determining the road load position of the rod 46 which abuts thereagainst in its upward travel. Similarly an adjustment screw 106 is provided in casing 94 against which the lower end of rod 46 is adapted to abut to determine the full load position of the rod. It is apparent that the adjustment screws 104 and 106 may be regulated in accordance with the type of engine operation desired. When the rod 46 is shifted either under the influence of spring 98 or manifold vacuum the point of connection of rod 40 and lever 38 momentarily becomes the fulcrum point of the lever 40.

Figure 3:
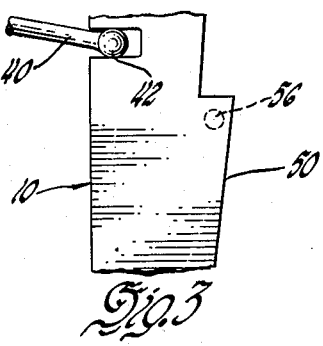
Figures 3–5 are fragmentary views of the metering valve under various operating conditions.

As already noted, it is necessary to provide the idle fuel spring 80 to insure an adequate idling fuel supply for the engine. There are occasions in the operation of the engine with which the subject fuel system is associated, however, when it is desirable to completely cut off the supply of fuel to the fuel lines 64. Such an occasion arises when the vehicle is decelerating under which condition fuel normally continues to be supplied to the engine cylinders and at least part of said fuel is pumped therefrom in an unburned state. As is well known such a condition is both wasteful of fuel and contributes to the fouling of the air. To avoid this condition, means is provided for cutting off the idling fuel supply under decelerating conditions of the engine. To this end, a solenoid 110 is mounted on the lower casing member 16 of the metering device A. The solenoid 110 includes an armature 112 having an enlarged end portion 114 which is adapted, under certain conditions, to engage the free end of idling spring 80 and move the latter downwardly out of engagement with the diaphragm 18 thereby permitting diaphragm spring 22 to move the diaphragm downwardly causing the sliding valve 10 to completely close the fuel ports 56 and 58 as shown in Figure 3.

The solenoid 110 may be controlled in any convenient way to indicate when the engine is decelerating. A simple illustrative control circuit is shown in Figure 8 in which an accelerator pedal 116 controls a switch having terminals 118 and 120. When pedal 116 is released switch 118—120 is open de-energizing the solenoid and permitting a spring 122 to move the armature 112 and end 114 downwardly to move spring 80 out of the way of diaphragm 18, as described. Upon depressing the accelerator pedal 116 the circuit is closed to permit current from a source 124 to energize solenoid 110 to move armature 112 upwardly and end 114 out of engagement with spring 80, as shown in Figure 1.

It is apparent that if deceleration were prolonged the engine would be deprived of fuel and hence stall. To prevent the engine from thus stalling and also to insure normal idling operation, a relay 126 is provided in parallel with switch 118—120. Relay 126 may be actuated by any force, such as manifold vacuum or generator voltage, which may be indicative of incipient engine stalling. For illustrative purposes, relay 126 is controlled by the voltage from generator 128. When the voltage output of generator 128 is above a given value the relay will be open leaving the control of solenoid 110 to switch 118—120. If the generator voltage falls off to a point where engine stalling is likely, a spring 130 will close the relay to energize solenoid 110 and thereby permitting normal idle operation of the fuel system.

Figure 6:
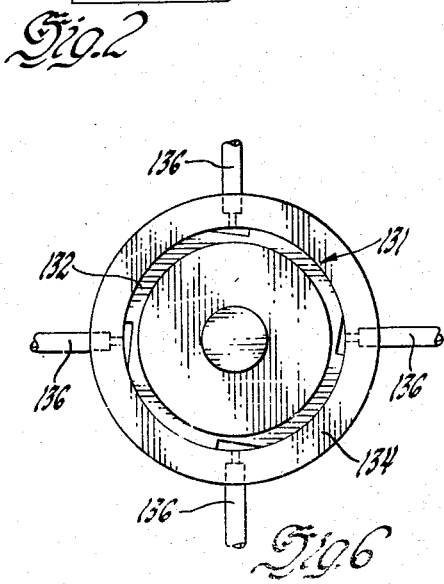
Figure 6 is a second species of the metering valve.

In addition to the species of metering valve 10 shown in Figures 1–5 other type fuel metering valve devices might be utilized. Other illustrative species are shown in Figures 6 and 7. In the species of Figure 6 a rotary type metering valve 131 is provided having a plurality of peripheral wedge portions 132 which are adapted to co-operate with a pair of axially disposed ports in the same manner as the device of Figure 1. In the species of Figure 6 a cylindrical casing 134 is provided with the requisite number of fuel passages 136 leading to the respective cylinders.

Another type metering valve arrangement is shown in Figure 7 and includes a plurality of individual wedge members or needles 140 respectively articulated to a central control arm 142 through connecting levers 144. Thus, as the central control arm 142 is rotated in a clockwise direction the wedges are inserted into the ports 146 diminishing the amount of fuel passing therethrough. In the species of Figures 6 and 7 the movement of the wedges whether integral or separate remains under the control of the diaphragm 18 and the function is the same as described.

Other structural modifications may be in the illustrative embodiments of the present invention without departing from the intended scope thereof.

I claim:

1. A continuous flow fuel system for an internal combustion engine comprising an induction passage having a throttle for controlling the flow of air therethrough, a source of fuel under pressure, passage means communicating said fuel with the induction passage posteriorly of the throttle, a metering valve in said passage means for varying the quantity of flow therethrough, a servo device connected to said valve, means biasing said device toward a position causing the valve to reduce the flow of fuel, means responsive to the mass of air flowing through the induction passage for urging the servo device in a fuel flow increasing direction with an increase in air flow, means opposing the action of said flow reducing means on said servo to insure sufficient flow of fuel through said valve for idling purposes, and a mechanism for rendering said opposing means inoperative during the deceleration of said engine whereby the flow reducing means causes said valve to cut off the flow of fuel to said induction passage.

2. A continuous flow fuel system for an internal combustion engine comprising an induction passage having a throttle for controlling the flow of air therethrough, an engine driven pump for supplying fuel under pressure, passage means for conveying said fuel to the induction passage posteriorly of the throttle, a metering valve in said passage means for varying the quantity of flow therethrough, a servo device connected to said valve, means biasing said device toward a position causing the valve to reduce the flow of fuel, a venturi in said induction passage, a conduit connecting said venturi and servo device whereby a force proportional to the mass of air flowing through the induction passage urges the servo device in a fuel flow increasing direction with an increase in air flow, spring means opposing the action of said flow reducing means on said servo to insure sufficient flow of fuel through said valve for idling purposes, and a mechanism for rendering said opposing means inoperative during the deceleration of said engine whereby the flow reducing means causes said valve to cut off the flow of fuel to said induction passage.

3. A continuous flow fuel system for an internal combustion engine comprising an induction passage having a throttle for controlling the flow of air therethrough, a source of fuel under pressure, passage means communicating said fuel with the induction passage posteriorly of the throttle, a metering valve in said passage means for varying the quantity of flow therethrough, a diaphragm device connected to said valve, a first spring member biasing said diaphragm toward a position causing the valve to reduce the flow of fuel, means responsive to the mass of air flowing through the induction passage for urging the diaphragm device in a fuel flow increasing direction with an increase in air flow, a second spring member adapted to engage said diaphragm prior to the closing of said valve by the first spring to insure sufficient flow of fuel through said valve for idling purposes, and a mechanism for rendering said second spring inoperative during the deceleration of said engine whereby the first spring member causes said valve to cut off the flow of fuel to said induction passage.

4. A continuous flow fuel system for an internal combustion engine comprising an induction passage having a throttle for controlling the flow of air therethrough, a source of fuel under pressure, passage means communicating said fuel with the induction passage posteriorly of the throttle, a metering valve in said passage means for varying the quantity of flow therethrough, a diaphragm device connected to said valve, a first spring member biasing said diaphragm toward a position causing the valve to reduce the flow of fuel, means responsive to the mass of air flowing through the induction passage for urging the diaphragm device in a fuel flow increasing direction with an increase in air flow, a second spring member adapted to engage said diaphragm prior to the closing of said valve by the first spring to insure sufficient flow of fuel through said valve for idling purposes, and a solenoid having an armature adapted to render said second spring inoperative to engage said diaphragm whereby said first spring causes said valve to stop the flow of fuel to said induction passage, means for energizing said solenoid to prevent the armature from engaging said second spring.

5. A continuous flow fuel system for an internal combustion engine comprising an induction passage having a throttle for controlling the flow of air therethrough, a source of fuel under pressure, passage means communicating said fuel with the induction passage posteriorly of the throttle, a metering valve in said passage means for varying the quantity of flow therethrough, a servo device connected to said valve, means biasing said device toward a position causing the valve to reduce the flow of fuel, means responsive to the mass of air flowing through the induction passage for urging the servo device in a fuel flow increasing direction with an increase in air flow, means opposing the action of said flow reducing means on said servo to insure sufficient flow of fuel through said valve for idling purposes, a mechanism for rendering said opposing means inoperative during the deceleration of said engine whereby the flow reducing means causes said valve to cut off the flow of fuel to said induction passage, and means operable by an engine operating condition for rendering said opposing means operative to prevent the engine stalling during deceleration.

6. A continuous flow fuel system for an internal combustion engine comprising an induction passage having a throttle for controlling the flow of air therethrough, a source of fuel under pressure, a fuel metering chamber, passage means communicating said fuel source with said chamber, a plurality of ports in said chamber, a passage communicating each port with a cylinder of the engine, a valve member movably mounted within said chamber, said valve member being formed to provide a plurality of identically contoured surfaces each of which is disposed proximate at least one of said ports, said valve surfaces and ports being arranged that movement of the valve in one direction tends to close said ports while movement in the opposite direction tends to open the ports, a servo device connected to said valve, means biasing said valve in a flow decreasing direction, means responsive to the mass of air flowing through the induction passage for urging the servo device in a fuel flow increasing direction with an increase in air flow, means opposing the action of said flow reducing means on said servo to insure sufficient flow through said valve for idling purposes, and a mechanism for rendering said opposing means inoperative during the deceleration of said engine whereby the flow reducing means causes said valve to cut off the flow of fuel to said induction passage.

7. A continuous flow fuel system for an internal combustion engine comprising an induction passage having a throttle for controlling the flow of air therethrough, a source of fuel under pressure, a fuel metering chamber, passage means communicating said fuel source with said chamber, a plurality of ports in said chamber, a passage communicating each port with a cylinder of the engine, a valve member movably mounted within said chambers, said valve member being formed to provide a plurality of identically contoured surfaces each of which is disposed intermediate a pair of axially spaced ports, said valve surfaces and ports being arranged that movement of the valve in one direction tends to close said ports while movement in the opposite direction tends to open the ports, the contoured valve surfaces being tapered to meter the quantity of fuel flowing through said ports during the movement of the valve between opened and closed positions, a servo device connected to said valve, means biasing said valve in a flow decreasing direction, means responsive to the mass of air flowing through the induction passage for urging the servo device in a fuel flow increasing direction with an increase in air flow, means opposing the action of said flow reducing means on said servo to insure sufficient flow through said valve for idling purposes, and a mechanism for rendering said opposing means inoperative during the deceleration of said engine whereby the flow reducing means causes said valve to cut off the flow of fuel to said induction passage.

8. A continuous flow fuel system for an internal combustion engine comprising an induction passage having a throttle for controlling the flow of air therethrough, a source of fuel under pressure, a fuel metering chamber, passage means communicating said fuel source with said chamber, a plurality of ports in said chamber, a passage respectively communicating each port with a cylinder of the engine, a valve member movably mounted within said chambers, said valve member being formed to provide a plurality of identically contoured surfaces each of which is disposed intermediate a pair of axially spaced ports, said valve surfaces and ports being arranged that movement of the valve in one direction tends to close said ports while movement in the opposite direction tends to open the ports, the contoured valve surfaces being tapered to meter the quantity of fuel flowing through said ports during the movement of the valve between opened and closed positions, a servo device connected to said valve, said device comprising a casing having a flexible diaphragm therein, a link element connecting said diaphragm and said valve, means biasing said valve in a flow decreasing direction, means responsive to the mass of air flowing through the induction passage for urging the diaphragm in a fuel flow increasing direction with an increase in air flow, means opposing the action of said flow reducing means on said servo to insure sufficient flow through said valve for idling purposes, and a mechanism for rendering said opposing means inoperative during the deceleration of said engine whereby the flow reducing means causes said valve to cut off the flow of fuel to said induction passage.

9. A continuous flow fuel system for an internal combustion engine comprising an induction passage having a throttle for controlling the flow of air therethrough, a source of fuel under pressure, a fuel metering chamber, passage means communicating said fuel source with said chamber, a plurality of ports in said chamber, a passage communicating each port with a cylinder of the engine, valve means disposed within said chamber in cooperating relation with said ports, means for actuating said valve means whereby movement of the latter means causes synchronized opening or closing of said ports to equally control the flow of fuel to the engine cylinders, said valve actuating means comprising a servo device responsive to the mass of air flowing through the induction passage for urging the valve in a flow increasing direction with an increase in air flow, means biasing said valve in a fuel flow reducing direction, means opposing the action of said flow reducing means on said valve to insure sufficient fuel flow through said valve for idling purposes, and a mechanism for rendering said opposing means inoperative during the deceleration of said engine whereby the flow reducing means causes said valve to cut off the flow of fuel to said cylinders.

10. A continuous flow fuel system for an internal combustion engine comprising an induction passage having a throttle for controlling the flow of air therethrough, a source of fuel under pressure, a fuel metering chamber, passage means communicating said fuel source with said chamber, a plurality of ports in said chamber, a passage communicating each port with a cylinder of the engine, valve means disposed within said chamber in cooperating relation with said ports, means for actuating said valve means whereby movement of the latter means causes synchronized opening or closing of said ports to equally control the flow of fuel to the engine cylinder, said valve actuating means comprising a servo device responsive to the mass of air flowing through the induction passage for urging the valve in a flow increasing direction with an increase of air flow, means biasing said valve in a fuel flow reducing direction, means opposing the action of said flow reducing means on said valve to insure sufficient fuel flow through said valve for idling purposes, a mechanism for rendering said opposing means inoperative during the deceleration of said engine whereby the flow reducing means causes said valve to cut off the flow of fuel to said cylinders, and means operable by an engine operating condition for rendering said opposing means operative during an incipient stalling condition of said engine during deceleration.

11. A continuous flow fuel system for an internal combustion engine comprising an induction passage having a throttle for controlling the flow of air therethrough, a source of fuel under pressure, a fuel metering chamber, passage means communicating said fuel source with said chamber, a plurality of ports in said chamber, a passage communicating each port with a cylinder of the engine, valve means disposed within said chamber in cooperating relation with said ports, means for actuating said valve means whereby movement of the latter means causes synchronized opening or closing of said ports to equally control the flow of fuel to the engine cylinder, said valve actuating means comprising a servo device responsive to the mass of air flowing through the induction passage for urging the valve in a flow increasing direction with an increase in air flow, a first spring element biasing said valve in a fuel flow reducing direction, a second spring element normally opposing the action of said first spring element on said valve to insure sufficient fuel flow through said valve for riding purposes, a mechanism for moving said second spring element to an inoperative position during the deceleration of said engine whereby the first spring element causes said valve to cut off the flow of fuel to said cylinders, and a device responsive to engine load for returning said second spring to its normal opposing position during incipient engine stalling conditions while the engine is decelerating.

12. A continuous flow fuel system for an internal combustion engine comprising an induction passage having a throttle for controlling the flow of air therethrough, a source of fuel under pressure, a fuel metering chamber, passage means communicating said fuel source with said chamber, a plurality of ports in said chamber, a passage communicating each port with a cylinder of the engine, valve means disposed within said chamber in cooperating relation with said ports, means for actuating said valve means whereby movement of the latter means causes synchronized opening or closing of said ports to equally control the flow of fuel to the engine cylinder, said valve actuating means comprising a servo device responsive to the mass of air flowing through the induction passage for urging the valve in a flow increasing direction with an increase in air flow, a first spring element biasing said valve in a fuel flow reducing direction, a second spring element normally opposing the action of said first spring element on said valve to insure sufficient fuel flow through said valve for idling purposes, a solenoid having an armature, spring means adapted to cause said armature to move said second spring to an inoperative position when said solenoid is de-energized, a first switch member operable only during deceleration of said engine to de-energize the solenoid, a second switch responsive to engine load for energizing said solenoid to move said armature out of engagement with the second spring during incipient stalling conditions while the engine is decelerating.

13. A continuous flow fuel system for an internal combustion engine comprising an induction passage having a throttle for controlling the flow of air therethrough, a source of fuel under pressure, passage means communicating said fuel with the induction passage posteriorly of the throttle, a metering valve in said passage means for varying the quantity of flow therethrough, a servo device connected to said valve, means biasing said device toward a position causing the valve to reduce the flow of fuel, means responsive to the mass of air flowing through the induction passage for urging the servo device in a fuel flow increasing direction with an increase in air flow, means opposing the action of said flow reducing means on said servo to insure sufficient flow of fuel through said valve for idling purposes, a mechanism for rendering said opposing means inoperative during the deceleration of said engine whereby the flow reducing means causes said valve to cut off the flow of fuel to said induction passage, and means connected to said valve means for modifying the actuation of said valve means by said servo device, said modifying means including a first element continuously urging said valve means in a fuel flow increasing direction and a second element which urges said valve in a fuel flow decreasing direction as the engine load decreases.

14. A continuous flow fuel system for an internal combustion engine comprising an induction passage having a throttle for controlling the flow of air therethrough, a source of fuel under pressure, passage means communicating said fuel with the induction passage posteriorly of the throttle, a metering valve in said passage means for varying the quantity of flow therethrough, a servo device connected to said valve, means biasing said device toward a position causing the valve to reduce the flow of fuel, means responsive to the mass of air flowing through the induction passage for urging the servo device in a fuel flow increasing direction with an increase in air flow, means opposing the action of said flow reducing means on said servo to insure sufficient flow of fuel through said valve for idling purposes, a mechanism for rendering said opposing means inoperative during the deceleration of said engine whereby the flow reducing means causes said valve to cut off the flow of fuel to said induction passage, and means connected to said valve means for modifying the actuation of said valve means by said servo device, said modifying means including a diaphragm operatively connected to said valve, a spring element continuously urging said diaphragm to move said valve to increase fuel flow, and means communicating engine manifold vacuum to said diaphragm to move said diaphragm and valve to a fuel flow decreasing direction as said vacuum increases.

15. A continuous flow fuel system for an internal combustion engine comprising an induction passage having a throttle for controlling the flow of air therethrough, a source of fuel under pressure, passage means communicating said fuel with the induction passage posteriorly of the throttle, a metering valve in said passage means for varying the quantity of flow therethrough, a servo device connected to said valve, means biasing said device toward a position causing the valve to reduce the flow of fuel, means responsive to the mass of air flowing through the induction passage for urging the servo device in a fuel flow increasing direction with an increase in air flow, means opposing the action of said flow reducing means on said servo to insure sufficient flow of fuel through said valve for idling purposes, a mechanism for rendering said opposing means inoperative during the deceleration of said engine whereby the flow reducing means causes said valve to cut off the flow of fuel to said induction passage, means operable only during incipient engine stalling conditions with the engine decelerating to render said opposing means operative, and means connected to said valve means for modifying the actuation of said valve means by said servo device, said modifying means including a first element continuously urging said valve means in a fuel flow increasing direction and a second element which urges said valve in a fuel flow decreasing direction as the engine load decreases.

16. A continuous flow fuel system as defined in claim 9 in which said valve means comprises a sliding bar member having a plurality of identically formed tapered portions longitudinally spaced therealong, each of the tapered bar portions being adapted to coact with and control the fuel flow through at least one of said ports which are axially aligned.

17. A continuous flow fuel system as defined in claim 9 in which said valve means comprises a circular member having a plurality of circumferentially spaced tapered sections, each of the tapered sections being adapted to coact with and control the fuel flow through at least one of said ports.

18. A continuous flow fuel system as defined in claim 9 in which said valve means comprises tapered valve elements adapted to coact with and variably limit the opening of each of said ports, a common operating member for said elements, and means connecting each of said elements with said member.

No references cited.